(12) United States Patent
Williams

(10) Patent No.: US 7,637,742 B1
(45) Date of Patent: Dec. 29, 2009

(54) CARBON DIOXIDE EXPERIMENT DEVICE

(76) Inventor: Ron Williams, 14755 E. 99th St. North, Owasso, OK (US) 74055

( * ) Notice: Subject to any disclaimer, the term of this patent is extended or adjusted under 35 U.S.C. 154(b) by 397 days.

(21) Appl. No.: 11/779,948

(22) Filed: Jul. 19, 2007

(51) Int. Cl.
*G09B 23/24* (2006.01)

(52) U.S. Cl. ..................................................... 434/298

(58) Field of Classification Search .............. 434/276, 434/298, 300, 302, 365, 393; 239/33; 446/153, 446/155
See application file for complete search history.

(56) References Cited

U.S. PATENT DOCUMENTS

| | | | | |
|---|---|---|---|---|
| 1,916,646 A | * | 7/1933 | Tycko | 239/33 |
| 3,348,921 A | * | 10/1967 | Katz et al. | 422/61 |
| 3,370,925 A | * | 2/1968 | Trueblood | 423/657 |
| 4,198,780 A | | 4/1980 | Kubiatowicz | |
| 4,733,785 A | * | 3/1988 | Turner et al. | 215/229 |
| 4,886,459 A | * | 12/1989 | Fuller | 434/300 |
| 5,242,307 A | * | 9/1993 | Reinbold | 434/298 |
| 5,393,258 A | | 2/1995 | Karterman | |
| 5,427,315 A | * | 6/1995 | Lipson | 239/33 |
| 5,713,664 A | * | 2/1998 | Harilela | 366/129 |
| 6,254,396 B1 | * | 7/2001 | Stevens | 434/276 |
| 6,319,535 B1 | | 11/2001 | Shaw | |
| 7,094,434 B2 | | 8/2006 | Gaonkar et al. | |
| 7,100,838 B1 | * | 9/2006 | Epstein | 239/33 |
| 7,112,111 B1 | | 9/2006 | King | |
| 7,448,935 B2 | * | 11/2008 | Trageser et al. | 446/267 |
| 2008/0096173 A1 | * | 4/2008 | Spangler | 434/276 |

* cited by examiner

*Primary Examiner*—Kurt Fernstrom
(74) *Attorney, Agent, or Firm*—Molly D. McKay

(57) ABSTRACT

A carbon dioxide gas buoyancy experiment device that can demonstrate how the buoyancy force acts against the force of gravity and how an object's buoyancy in a fluid can be manipulated by altering the object's density. The device demonstrates how the buoyancy force works in practice by submerging bundles of hydrophobic fingers capable of collecting gas into a gas releasing liquid such as soda. As the finger bundles collect gas bubbles released by the liquid, the volume of the submerged finger bundles increases, thereby increasing their buoyancy and causing the finger bundles to ascend and float in the liquid. The finger bundles can be pushed back down in the liquid, but will rise again due to the increased buoyancy imparted by the gas bubbles that adhere to the finger bundles.

5 Claims, 2 Drawing Sheets

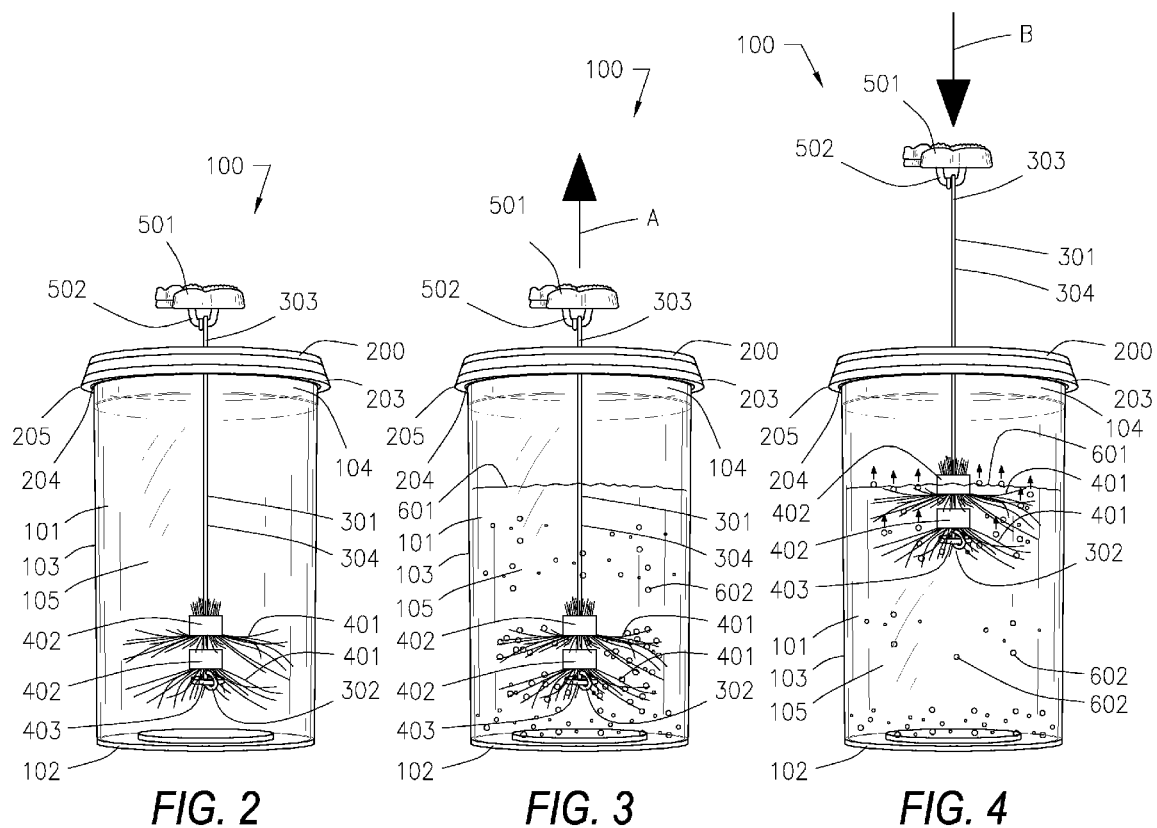

CARBON DIOXIDE EXPERIMENT DEVICE

BACKGROUND OF THE INVENTION

1. Field of the Invention

The invention relates generally to experiment devices, and more particularly to a carbon dioxide gas buoyancy experiment device.

2. Description of the Related Art

Carbon dioxide gas buoyancy experiment devices and buoyancy toys are known in the prior art. Commonly these devices and toys consist of a cavity or gas chamber contained within or about the body of the device or toy used for capturing or containing a gas. The devices and toys ascend and descend in their medium depending on the amount of gas or air maintained in the toy or device. Although these devices and toys exhibit the buoyancy force, they are inadequate as demonstration devices because there is no clear view of the mechanism in action.

SUMMARY OF THE INVENTION

In physics, buoyancy can be described generally as the upward force on an object produced by surrounding fluid due to differences in pressure exerted on the top and bottom of the object by the fluid. Fundamentally, the buoyancy force exerted by a fluid on an object is equal to the weight of the displaced fluid and is directly dependent on the volume of the object and the density of the surrounding fluid. As the volume of the object increases, the amount of fluid displaced by the object increases, thereby increasing the weight of the displaced fluid and the buoyancy force. As the buoyancy force increases, the object ascends in the fluid; as the buoyancy force decreases, the object descends in the fluid. From a practical standpoint, buoyancy is an important force that acts on boats, submarines, offshore drilling platforms, divers, airships, balloons, etc. Many marine animals also use buoyancy to adjust or maintain their position in water at certain depths. Although buoyancy is a relatively simple concept in theory, it can be difficult to visualize.

It is the primary object of the invention to present a simple carbon dioxide gas buoyancy experiment device that can demonstrate to children how the buoyancy force acts against the force of gravity and how an object's buoyancy in a fluid can be manipulated by altering the object's density. The present embodiment demonstrates how the buoyancy force works in practice by submerging bundles of hydrophobic fingers capable of collecting gas from a gas releasing liquid, i.e., soda, carbonated water, beer, champagne, sparkling wine, etc. As the finger bundles collect gas released by the liquid, the volume of the submerged finger bundles increase thereby increasing their displacement and buoyancy, thus causing the finger bundles to ascend and float in the liquid. The present embodiment is especially useful for purposes of demonstration because the collection of gas is plainly visible and the resulting increase in volume of the finger bundles can be easily seen by onlookers.

BRIEF DESCRIPTION OF THE DRAWINGS

FIG. 2 illustrates a side view of the invention.

FIG. 3 illustrates an additional side view of the invention with a gas releasing liquid contained therein and shows gas bubbles being collected by finger bundles which causes the finger bundles to ascend in the liquid FIG. 4 illustrates an additional side view of the invention with a gas releasing liquid contained therein and shows the finger bundles, along with their accompanying structure floating in the liquid prior to being pushed back downward by the user.

DETAILED DESCRIPTION OF THE PREFERRED EMBODIMENT

Figure 1:
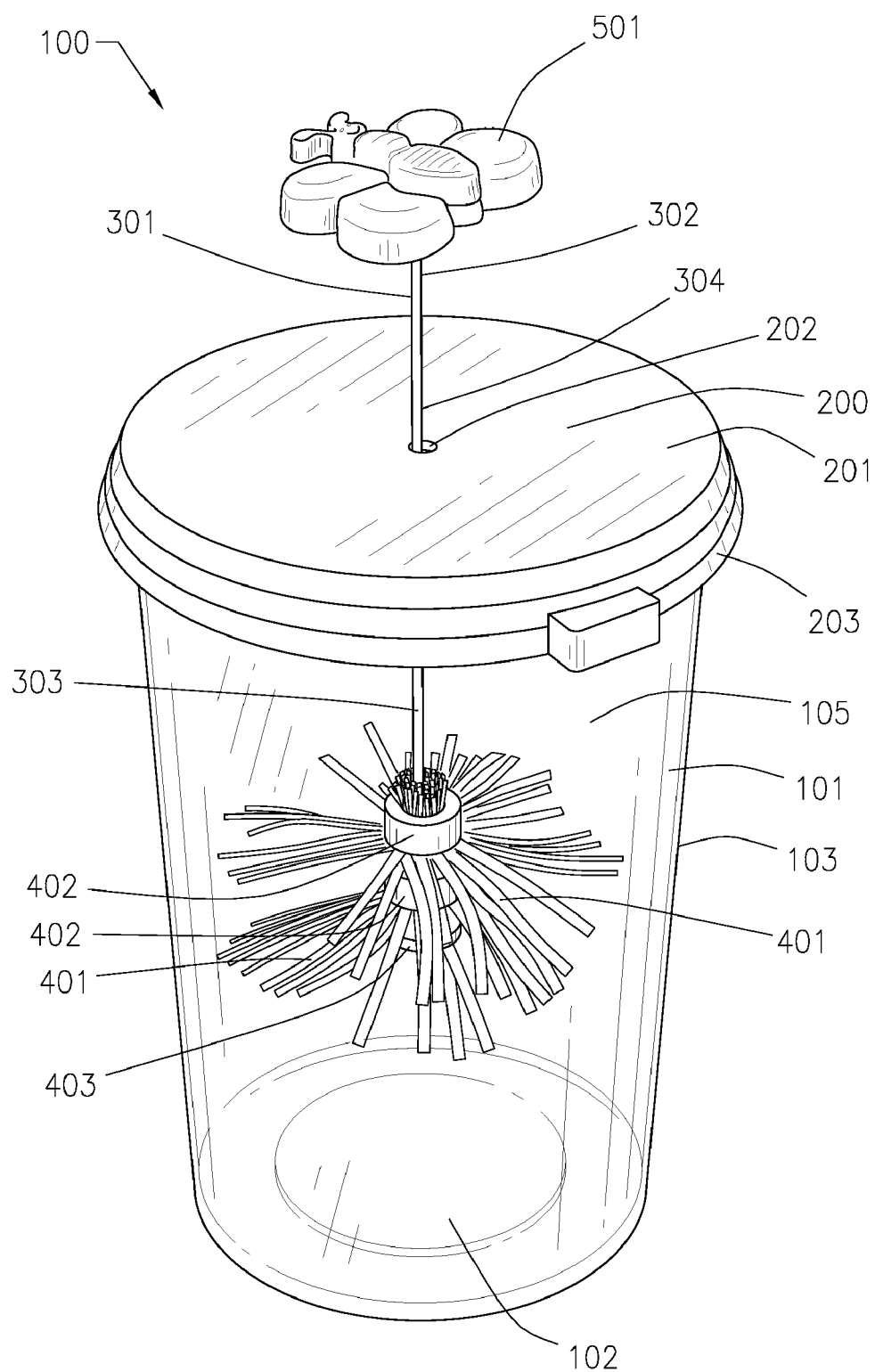
FIG. 1 illustrates a perspective view of the invention.

The embodiments discussed herein are merely illustrative of specific manners in which to make and use the invention and are not to be interpreted as limiting the scope of the instant invention.

Referring now to FIGS. 1 and 2, the present invention 100 includes a liquid container 101, having a base 102, a side wall 103 extending generally upward from the base terminating at a rim 104 that surrounds an open top. A lid 200 has a flat body 201 with a hole therein 202, and a lid lip 203 extending generally downwardly from the body, with an inner circumference 204 and an outer circumference 205. The lid lip 103 is detachably attachable to the rim 104 of the liquid container 101 so that the lid 200 covers the open top thereof. In the present embodiment, the liquid container 101 is formed of transparent plastic; however, the container 101 may be formed from any material capable of containing a liquid. Although the container 101 is preferably transparent, the invention is not so limited and the container can be constructed of transparent, translucent or opaque material. In the present embodiment, the lid 200 is formed of an opaque plastic, but it may be formed of any other suitable material and, like the liquid container, the material may be transparent, translucent or opaque.

In the present embodiment, the means for attaching the lid 201 to the liquid container is a rim lip located on the outer edge of the container rim 104 and a matching groove located on the inner circumference 204 of the lid lip 203. The lid 200 is attached to the container by pressing the lid 200 onto the rim 104 of the container and interlocking the groove with the rim lip. Although not illustrated, the means for detachably attaching the lid to the container could alternately include cooperating threads located on the lid and container rim, whereby the lid is tightened onto the container.

The lid hole 202 is large enough in diameter to permit a narrow rigid rod member or wire 301 to pass there through, yet small enough to prevent a large amount of liquid from being spilled if the invention is overturned. The rigid rod member 301, having a first end 302 and a second end 303 is positioned through the lid hole 202 with the ends of the rigid rod member 301 extending from both sides of the lid 200. The first end 302 of the rigid rod member 301 extends into a cavity 105 of the container 101 when the lid 200 is attached thereto, and the second end 303 extends through the lid hole 203 and outside the container 101. In the present embodiment, the rigid rod member 301 is preferably formed of a straight stainless steel wire.

Attached to the first end 302 of the rigid rod member 301 is a means for collecting carbon dioxide gas bubbles 602 as the bubbles 602 are released from a carbonated liquid 601 such as soda pop. In the present embodiment, the means for collecting carbon dioxide bubbles 602 is a pair of hydrophobic finger bundles 401 held onto the rigid member 301 by small rubber bands 402. The finger bundles 401 are held into place vertically on the rigid member 301 by a washer 403 around which is looped the first end 302 of the rigid rod member 301. In other embodiments, the means for collecting carbon dioxide bubbles 602 could include a single hydrophobic finger bundle 401 or a plurality of hydrophobic finger bundles 401.

Although not illustrated, the means for collecting carbon dioxide bubbles 602 could alternately include a hydrophobic net or mesh, or a plurality thereof, extending generally outwardly from the rigid rod member 301.

Attached to the second end 303 of the rigid rod member 301 is a decorative element that can be used as a means for grasping the rigid rod member 301. In the present embodiment, the decorative element which can be used as a means for grasping the rigid member is a button 501 with a button shank or loop 502 around which is looped the second end 303 of the rigid rod member 301 to secure the button 501 to the rod 301. Together the button 501, the rod 301, and the attached finger bundles 402 form the rod assembly 304 for the invention 100.

As illustrated in FIG. 3, the container 101 is partially filled with a carbonated liquid 601 such as soda, beer, champagne, carbonated water, sparkling wine, etc. Then the lid 201 and accompanying rod assembly 304 are attached to the container 101 with the first end 302 of the rigid rod member 301 and the attached finger bundles 402 being submerged in the carbonated liquid 601. As carbon dioxide bubbles 602 are released from the carbonated liquid 600, the carbon dioxide gas bubbles 602 are collected in the finger bundles 401 causing the effective volume of the finger bundles 402 to increase, thereby increasing the buoyancy of the rod assembly 304. As a result, the rod assembly 304 rises in the liquid 601, thereby demonstrating the buoyancy force in action. The upward movement of the rod assembly 304 is shown in FIG. 3 by Arrow A.

As illustrated by the small arrows in FIG. 4, when the finger bundles 401 contact the surface of the carbonated liquid 601, some of the gas bubbles 602 may be released to atmosphere. However, sufficient gas bubbles 602 remain on the finger bundles 401 to keep the rod assembly 304 in a raised position until a user pushes downward on the decorative element 501. This downward movement is indicated in FIG. 4 by Arrow B. After being pushed downward in the liquid 601, once the user removes the downward pushing force on the button 501, the rod assembly 304 will once again rise in the liquid 601 due to the increased buoyancy imparted by the gas bubbles 602 that adhere to the finger bundles 401.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A carbon dioxide gas experiment device comprising:
    a liquid container with an open top for receiving a carbonated liquid therein,
    a lid with a hole therethrough for detachably sealing the open top of the container,
    means for detachably attaching said lid to said liquid container to cover said open top,
    a rod movably extending through the hole in the lid so that a first end of the rod extends into the container and a second end extends outside the container, and
    means for collecting carbon dioxide gas bubbles attached near said first end of the rod for the purpose of causing buoyancy when gas bubble attach thereto.

2. A carbon dioxide gas experiment device according to claim 1, wherein said means for collecting carbon dioxide gas bubbles further comprises:
    at least one hydrophobic finger bundle.

3. A carbon dioxide gas experiment device according to claim 1 further comprising:
    a decorative element attached at the second end of said rod.

4. A carbon dioxide gas experiment device according to claim 3 wherein said decorative element is a button.

5. A carbon dioxide gas experiment device as recited in claim 1, wherein said liquid container is formed of a transparent material.

\* \* \* \* \*